(12) United States Patent
Ueda

(10) Patent No.: US 7,787,881 B2
(45) Date of Patent: Aug. 31, 2010

(54) RADIO NETWORK CONTROLLER, A MOBILE COMMUNICATION SYSTEM, AND A NEIGHBOR CELL LIST FILTERING METHOD

(75) Inventor: Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/414,080

(22) Filed: Mar. 30, 2009

(65) Prior Publication Data

US 2009/0203381 A1 Aug. 13, 2009

Related U.S. Application Data

(62) Division of application No. 11/350,921, filed on Feb. 10, 2006.

(30) Foreign Application Priority Data

Feb. 14, 2005 (JP) .............................. 2005-035978

(51) Int. Cl.
*H04W 36/00* (2009.01)
(52) U.S. Cl. ....................... 455/439; 455/436; 370/331; 370/343; 370/344
(58) Field of Classification Search ................ 455/439, 455/436; 370/335, 441, 479, 328
See application file for complete search history.

(56) References Cited

U.S. PATENT DOCUMENTS

2004/0125768 A1* 7/2004 Yoon et al. .................. 370/331

FOREIGN PATENT DOCUMENTS

| JP | 03-078936 A | 3/2003 |
|---|---|---|
| WO | 03/071824 A1 | 8/2003 |
| WO | 2004/025983 A1 | 3/2004 |
| WO | 2004-025983 A1 | 3/2004 |

OTHER PUBLICATIONS

Motorola: "Change Request, Clarifications to compressed mode usage" 3GPP TSG-RAN WG1 Meeting #17, Nov. 24, 2000, XP002383059 Stockholm, Sweden paragraph [6.1.1.1].
"Change Request, Clarifications to compressed mode usage", 3GPP TSG-RAN WG1 Meeting #17 Tdoc r1-00/1403, Nov. 24, 2000.

* cited by examiner

*Primary Examiner*—Ajit Patel
*Assistant Examiner*—Khai M Nguyen
(74) *Attorney, Agent, or Firm*—Sughrue Mion, PLLC

(57) ABSTRACT

The present invention provides a mobile communication system, a radio network controller (RNC), and a neighbor cell list filtering method which can control the selection of a frequency to be used at the hard handover performed in a network environment using a plurality of frequency bands and frequencies to reduce the number of activation of the compressed mode operation as much as possible. The RNC produces a filtered neighbor cell list by using information contained in the UE capability indication reported by the user equipment and the use priority data on frequencies designated by the network operator, and neighbor cell information only suitable for the handover is left in the neighbor cell list and notified to the user equipment.

10 Claims, 22 Drawing Sheets

| CELL ID | FREQUENCY BAND | UPLINK FREQUENCY NUMBER |
|---|---|---|
| 1 | FREQUENCY BAND 1 | 9612 |
| 2 | FREQUENCY BAND 1 | 9612 |
| 3 | FREQUENCY BAND 1 | 9612 |
| 4 | FREQUENCY BAND 1 | 9612 |
| 5 | FREQUENCY BAND 1 | 9612 |
| 6 | FREQUENCY BAND 1 | 9612 |
| 7 | FREQUENCY BAND 1 | 9613 |
| 8 | FREQUENCY BAND 1 | 9613 |
| 9 | FREQUENCY BAND 1 | 9613 |
| 10 | FREQUENCY BAND 1 | 9613 |
| 11 | FREQUENCY BAND 1 | 9613 |
| 12 | FREQUENCY BAND 1 | 9613 |
| 13 | FREQUENCY BAND 1 | 9614 |
| 14 | FREQUENCY BAND 1 | 9614 |
| 15 | FREQUENCY BAND 1 | 9614 |
| 16 | FREQUENCY BAND 1 | 9614 |
| 17 | FREQUENCY BAND 1 | 9614 |
| 18 | FREQUENCY BAND 1 | 9614 |
| 19 | FREQUENCY BAND 3 | 8562 |
| 20 | FREQUENCY BAND 3 | 8562 |
| 21 | FREQUENCY BAND 3 | 8562 |
| 22 | FREQUENCY BAND 3 | 8562 |
| 23 | FREQUENCY BAND 3 | 8562 |
| 24 | FREQUENCY BAND 3 | 8562 |
| 25 | FREQUENCY BAND 6 | 4162 |
| 26 | FREQUENCY BAND 6 | 4162 |
| 27 | FREQUENCY BAND 6 | 4162 |
| 28 | FREQUENCY BAND 6 | 4162 |
| 29 | FREQUENCY BAND 6 | 4162 |
| 30 | FREQUENCY BAND 6 | 4162 |

FIG.5

| OWN CELL FREQUENCY BAND | MEASURING FREQUENCY BAND | COMPRESSED MODE (UP LINK) | COMPRESSED MODE (DOWN LINK) |
|---|---|---|---|
| FREQUENCY BAND 1 | FREQUENCY BAND 1 | NOT NEED | NOT NEED |
| FREQUENCY BAND 1 | FREQUENCY BAND 3 | NEED | NOT NEED |
| FREQUENCY BAND 1 | FREQUENCY BAND 5 | NOT NEED | NOT NEED |
| FREQUENCY BAND 3 | FREQUENCY BAND 1 | NOT NEED | NOT NEED |
| FREQUENCY BAND 3 | FREQUENCY BAND 3 | NEED | NOT NEED |
| FREQUENCY BAND 3 | FREQUENCY BAND 5 | NOT NEED | NOT NEED |
| FREQUENCY BAND 5 | FREQUENCY BAND 1 | NOT NEED | NOT NEED |
| FREQUENCY BAND 5 | FREQUENCY BAND 3 | NOT NEED | NOT NEED |
| FREQUENCY BAND 5 | FREQUENCY BAND 5 | NEED | NOT NEED |

FIG.7

| FREQUENCY BAND | PRIORITY |
|---|---|
| FREQUENCY BAND 1 | 1 |
| FREQUENCY BAND 3 | 2 |
| FREQUENCY BAND 6 | 3 |

FIG.8

| FREQUENCY | PRIORITY |
|---|---|
| 9612 | 3 |
| 9613 | 2 |
| 9614 | 1 |

FIG.9

| CELL ID | FREQUENCY BAND | UPLINK FREQUENCY NUMBER |
| --- | --- | --- |
| 7 | FREQUENCY BAND 1 | 9613 |
| 8 | FREQUENCY BAND 1 | 9613 |
| 9 | FREQUENCY BAND 1 | 9613 |
| 10 | FREQUENCY BAND 1 | 9613 |
| 11 | FREQUENCY BAND 1 | 9613 |
| 12 | FREQUENCY BAND 1 | 9613 |
| 13 | FREQUENCY BAND 1 | 9614 |
| 14 | FREQUENCY BAND 1 | 9614 |
| 15 | FREQUENCY BAND 1 | 9614 |
| 16 | FREQUENCY BAND 1 | 9614 |
| 17 | FREQUENCY BAND 1 | 9614 |
| 18 | FREQUENCY BAND 1 | 9614 |

FIG.10

| OWN CELL FREQUENCY BAND | MEASURING FREQUENCY BAND | COMPRESSED MODE (UP LINK) | COMPRESSED MODE (DOWN LINK) |
|---|---|---|---|
| FREQUENCY BAND 1 | FREQUENCY BAND 1 | NOT NEED | NOT NEED |

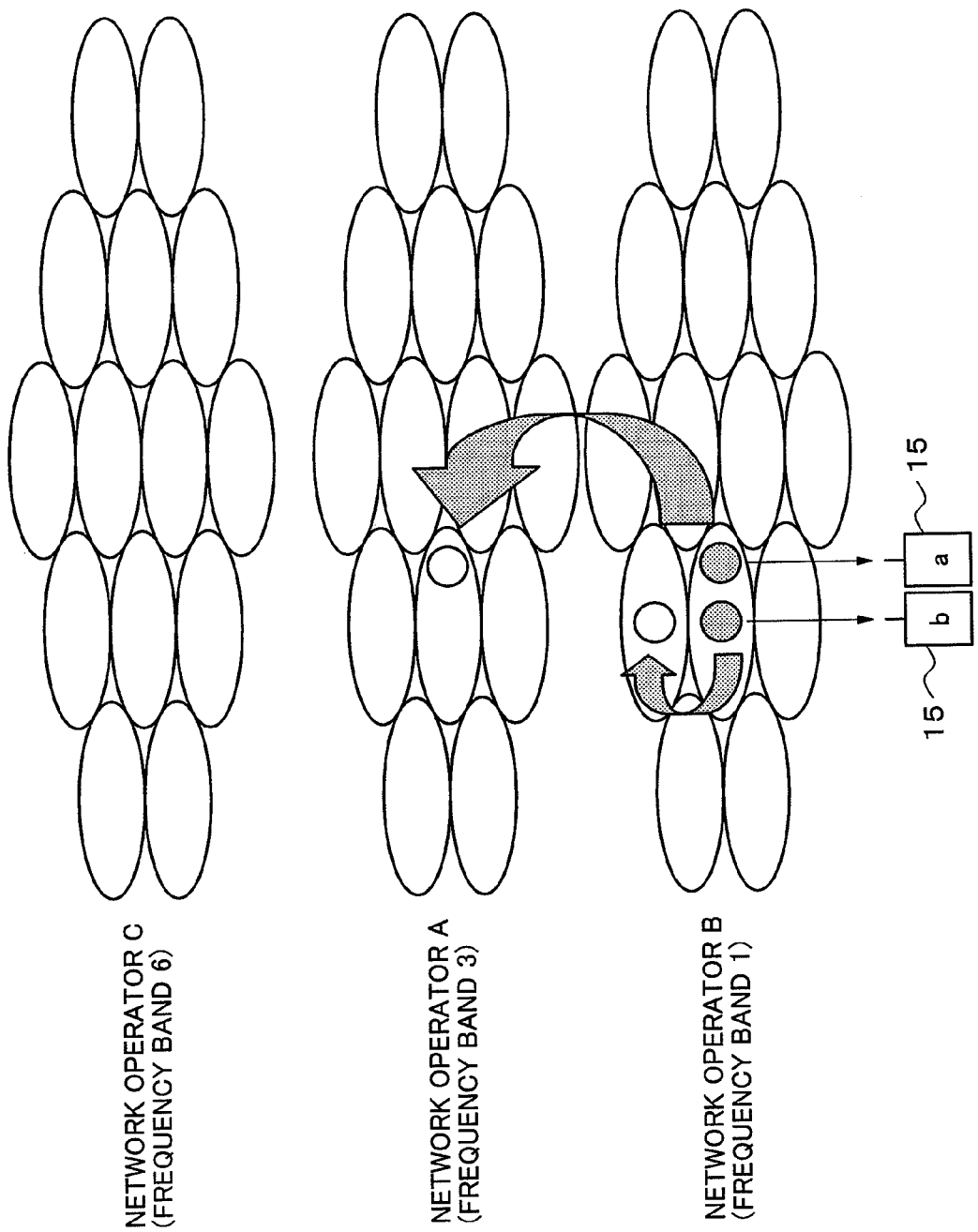

| NETWORK OPERATOR | USE FREQUENCY BAND | PRIORITY |
|---|---|---|
| PLMN ID = A | FREQUENCY BAND 1 | 2 |
|  | FREQUENCY BAND 3 | 1 |
|  | FREQUENCY BAND 6 | 3 |
| PLMN ID = B | FREQUENCY BAND 1 | 1 |
|  | FREQUENCY BAND 3 | 2 |
|  | FREQUENCY BAND 6 | 3 |

FIG.14

| NETWORK OPERATOR | UARFCN | PRIORITY |
|---|---|---|
| PLMN ID = A | 8562 | 1 |
|  | 8563 | 2 |
|  | 8564 | 3 |
| PLMN ID = B | 9612 | 3 |
|  | 9613 | 2 |
|  | 9614 | 1 |

FIG.15

| CELL ID | FREQUENCY BAND | UPLINK FREQUENCY NUMBER (UARFCN) |
|---|---|---|
| 19 | FREQUENCY BAND 3 | 8562 |
| 20 | FREQUENCY BAND 3 | 8562 |
| 21 | FREQUENCY BAND 3 | 8562 |
| 22 | FREQUENCY BAND 3 | 8562 |
| 23 | FREQUENCY BAND 3 | 8562 |
| 24 | FREQUENCY BAND 3 | 8562 |

FIG.16

| OWN CELL FREQUENCY BAND | MEASURING FREQUENCY BAND | COMPRESSED MODE (UP LINK) | COMPRESSED MODE (DOWN LINK) |
|---|---|---|---|
| FREQUENCY BAND 1 | FREQUENCY BAND 3 | NEED | NOT NEED |

FIG.18

| CELL ID | FREQUENCY BAND | UPLINK FREQUENCY NUMBER (UARFCN) | RADIO LOAD | LOAD TOTAL FOR EVERY FREQUENCY | FREQUENCY PRIORITY |
|---|---|---|---|---|---|
| 1 | FREQUENCY BAND 1 | 9612 | 0.4 | 2.1 | 3 |
| 2 | FREQUENCY BAND 1 | 9612 | 0.5 | | |
| 3 | FREQUENCY BAND 1 | 9612 | 0.2 | | |
| 4 | FREQUENCY BAND 1 | 9612 | 0.5 | | |
| 5 | FREQUENCY BAND 1 | 9612 | 0.3 | | |
| 6 | FREQUENCY BAND 1 | 9612 | 0.2 | | |
| 7 | FREQUENCY BAND 1 | 9613 | 0.3 | 2.0 | 2 |
| 8 | FREQUENCY BAND 1 | 9613 | 0.4 | | |
| 9 | FREQUENCY BAND 1 | 9613 | 0.3 | | |
| 10 | FREQUENCY BAND 1 | 9613 | 0.2 | | |
| 11 | FREQUENCY BAND 1 | 9613 | 0.7 | | |
| 12 | FREQUENCY BAND 1 | 9613 | 0.1 | | |
| 13 | FREQUENCY BAND 1 | 9614 | 0.7 | 2.9 | 5 |
| 14 | FREQUENCY BAND 1 | 9614 | 0.4 | | |
| 15 | FREQUENCY BAND 1 | 9614 | 0.6 | | |
| 16 | FREQUENCY BAND 1 | 9614 | 0.4 | | |
| 17 | FREQUENCY BAND 1 | 9614 | 0.3 | | |
| 18 | FREQUENCY BAND 1 | 9614 | 0.5 | | |
| 19 | FREQUENCY BAND 3 | 8562 | 0.2 | 2.2 | 4 |
| 20 | FREQUENCY BAND 3 | 8562 | 0.4 | | |
| 21 | FREQUENCY BAND 3 | 8562 | 0.2 | | |
| 22 | FREQUENCY BAND 3 | 8562 | 0.8 | | |
| 23 | FREQUENCY BAND 3 | 8562 | 0.2 | | |
| 24 | FREQUENCY BAND 3 | 8562 | 0.4 | | |
| 25 | FREQUENCY BAND 6 | 4162 | 0.2 | 1.9 | 1 |
| 26 | FREQUENCY BAND 6 | 4162 | 0.4 | | |
| 27 | FREQUENCY BAND 6 | 4162 | 0.3 | | |
| 28 | FREQUENCY BAND 6 | 4162 | 0.4 | | |
| 29 | FREQUENCY BAND 6 | 4162 | 0.2 | | |
| 30 | FREQUENCY BAND 6 | 4162 | 0.4 | | |

FIG.22

| CELL ID | FREQUENCY BAND | UPLINK FREQUENCY NUMBER (UARFCN) | RADIO LOAD | LOAD TOTAL FOR EVERY FREQUENCY | FREQUENCY PRIORITY |
|---|---|---|---|---|---|
| 1 | FREQUENCY BAND 1 | 9612 | 0.4 | 2.1 | 3 |
| 2 | FREQUENCY BAND 1 | 9612 | 0.5 | | |
| 3 | FREQUENCY BAND 1 | 9612 | 0.2 | | |
| 4 | FREQUENCY BAND 1 | 9612 | 0.5 | | |
| 5 | FREQUENCY BAND 1 | 9612 | 0.3 | | |
| 6 | FREQUENCY BAND 1 | 9612 | 0.2 | | |
| 7 | FREQUENCY BAND 1 | 9613 | 0.3 | 2.0 | 2 |
| 8 | FREQUENCY BAND 1 | 9613 | 0.4 | | |
| 9 | FREQUENCY BAND 1 | 9613 | 0.3 | | |
| 10 | FREQUENCY BAND 1 | 9613 | 0.2 | | |
| 11 | FREQUENCY BAND 1 | 9613 | 0.7 | | |
| 12 | FREQUENCY BAND 1 | 9613 | 0.1 | | |

FIG.23

UTRA FDD FREQUENCY BANDS

| OPERATING BAND | UL FREQUENCIES UE TRANSMIT, NODE B RECEIVE | DL FREQUENCIES UE RECEIVE, NODE B TRANSMIT |
| --- | --- | --- |
| 1 | 1920 – 1980 MHz | 2110 – 2170 MHz |
| 2 | 1850 – 1910 MHz | 1930 – 1990 MHz |
| 3 | 1710 – 1785 MHz | 1805 – 1880 MHz |
| 4 | 1710 – 1755 MHz | 2110 – 2155 MHz |
| 5 | 824 – 849 MHz | 869 – 894 MHz |
| 6 | 830 – 840 MHz | 875 – 885 MHz |

FIG.25

UARFCN DEFINITION (GENERAL)

| UPLINK (UL) UE TRANSMIT, NODE B RECEIVE | | DOWN LINK (DL) UE RECEIVE, NODE B TRANSMIT | |
| --- | --- | --- | --- |
| UARFCN | CARRIER FREQUENCY [MHz] ($F_{UL}$) (NOTE 1) | UARFCN | CARRIER FREQUENCY [MHz] ($F_{DL}$) (NOTE 2) |
| $N_u = 5 * F_{UL}$ | $0.0 \text{ MHz} \leq F_{UL} \leq 3276.6 \text{ MHz}$ | $N_d = 5 * F_{DL}$ | $0.0 \text{ MHz} \leq F_{DL} \leq 3276.6 \text{ MHz}$ |

NOTE 1 : $F_{UL}$ IS THE UPLINK FREQUENCY IN MHz

NOTE 2 : $F_{DL}$ IS THE DOWNLINK FREQUENCY IN MHz

FIG.26

UARFCN DEFINITION (ADDITIONAL CHANNELS)

| BAND | UPLINK (UL) UE TRANSMIT, NODE B RECEIVE | | DOWN LINK (DL) UE RECEIVE, NODE B TRANSMIT | |
|---|---|---|---|---|
| | UARFCN | CARRIER FREQUENCY [MHz] ($F_{UL}$) | UARFCN | CARRIER FREQUENCY [MHz] ($F_{DL}$) |
| 1 | – | – | – | – |
| 2 | $N_u = 5*(F_{UL} - 1850.1\ MHz)$ | 1852.5, 1857.5, 1862.5, 1867.5, 1872.5, 1877.5, 1882.5, 1887.5, 1892.5, 1897.5, 1902.5, 1907.5 | $N_d = 5*(F_{DL} - 1850.1\ MHz)$ | 1932.5, 1937.5, 1942.5, 1947.5, 1952.5, 1957.5, 1962.5, 1967.5, 1972.5, 1977.5, 1982.5, 1987.5 |
| 3 | – | – | – | – |
| 4 | $N_u = 5*(F_{UL} - 1480.1\ MHz)$ | 1712.5, 1717.5, 1722.5, 1727.5, 1732.5, 1737.5, 1742.5, 1747.5, 1752.5 | $N_d = 5*(F_{DL} - 1820.1\ MHz)$ | 2112.5, 2117.5, 2122.5, 2127.5, 2132.5, 2137.5, 2142.5, 2147.5, 2152.5 |
| 5 | $N_u = 5*(F_{UL} - 670.1\ MHz)$ | 826.5, 827.5, 831.5, 832.5, 837.5, 842.5 | $N_d = 5*(F_{DL} - 670.1\ MHz)$ | 871.5, 872.5, 876.5, 877.5, 882.5, 887.5 |
| 6 | $N_u = 5*(F_{UL} - 670.1\ MHz)$ | 832.5, 837.5 | $N_d = 5*(F_{DL} - 670.1\ MHz)$ | 877.5, 882.5 |

FIG.27

UTRA ABSOLUTE RADIO FREQUENCY CHANNEL NUMBER

| BAND | UPLINK (UL) UE TRANSMIT, NODE B RECEIVE | | DOWN LINK (DL) UE RECEIVE, NODE B TRANSMIT | |
|---|---|---|---|---|
| | GENERAL | ADDITIONAL | GENERAL | ADDITIONAL |
| 1 | 9612 TO 9888 | — | 10562 TO 10838 | — |
| 2 | 9262 TO 9538 | 12, 37, 62, 87, 112, 137, 162, 187, 212, 237, 262, 287 | 9662 TO 9938 | 412, 437, 462, 487, 512, 537, 562, 587, 612, 637, 662, 687 |
| 3 | 8562 TO 8913 | — | 9037 TO 9388 | — |
| 4 | 8562 TO 8763 | 1162, 1187, 1212, 1237, 1262, 1287, 1312, 1337, 1362 | 10562 TO 10763 | 1462, 1487, 1512, 1537, 1562, 1587, 1612, 1637, 1662 |
| 5 | 4132 TO 4233 | 782, 787, 807, 812, 837, 862 | 4357 TO 4458 | 1007, 1012, 1032, 1037, 1062, 1087 |
| 6 | 4162 TO 4188 | 812, 837 | 4387 TO 4413 | 1037, 1062 |

FIG.28

RADIO NETWORK CONTROLLER, A MOBILE COMMUNICATION SYSTEM, AND A NEIGHBOR CELL LIST FILTERING METHOD

This is a divisional of application Ser. No. 11/350,921 filed Feb. 10, 2006 which claims priority from Japanese Application No. 2005-35978, filed Feb. 14, 2005. The entire disclosures of the prior applications are considered part of the disclosure of the accompanying divisional application and are hereby incorporated by reference.

BACKGROUND OF THE INVENTION

1. Field of the Invention

The present invention relates to a mobile communication system for executing a hard handover, which performs communication using different frequencies before and after the handover, under an environment which is supporting a mixed usage of a plurality of frequency bands or frequencies. In particular, this relates to a mobile communication system which can suppress the execution of a compressed mode as much as possible when selecting a neighbor cell which becomes a candidate of the handover partner, and can control the selection of a frequency to be used after the handover by a mobile communication system itself.

2. Description of the Related Art

An IMT (International Mobile Communication)-2000 mobile communication system can be developed in an environment which is supporting a mixed usage of a plurality of frequency bands or a plurality of frequencies. Then, in 3GPP (3rd Generation Partnership Project), available frequency bands in a mobile communication system are specified as shown in FIG. 24 as UTRAN (UMTS Terrestrial Radio Access Network) FDD (Frequency Division Duplex) Frequency bands.

With referring to FIG. 25, six frequency bands (Operating Bands) of 1 to 6 are available. For each frequency band, UL (uplink) Frequencies and DL (downlink) Frequencies are assigned to an uplink and a downlink, respectively. The uplink is a link through which mobile equipment (UE: user equipment) performs signal transmission and a base station (Node-B) performs signal reception, and the downlink is a link through which the Node-B performs signal transmission and the UE performs signal reception.

It is determined by every country or region how to assign the actual frequency bands defined in the 3GPP to communication common carriers (Communication Administrators or Network Operators: hereafter, these are called network operators) or systems. In addition, it is permitted to use these frequency bands are mixed in the same area.

Furthermore, a UARFCN (UTRA Absolute Radio Frequency Channel Number) corresponding to a carrier frequency used within each frequency band is defined by the 3GPP.

FIG. 26 is a table showing relation between the UARFCN and carrier frequencies for general channels which are specified by the 3GPP. FIG. 27 is a table showing relation between the UARFCN and carrier frequencies for additional channels which are specified by the 3GPP. In the IMT-2000 mobile communication system, the UARFCN defined in FIGS. 26 and 27 are used in respective frequency bands 1 to 6 as shown in FIG. 28.

In addition, the UE of the IMT-2000 mobile communication system measures signal level of the CPICH (Common Pilot Channel) of frequency bands used by neighbor cells which become candidates of the handover partner, so as to determine whether the hard handover can be performed. In this case, the neighbor cells may be using a different frequency band from the frequency band currently used by the UE in the environment which permits a mixed usage of a plurality of frequency bands and frequencies.

At this time, a radio network controller (RNC) makes a Node-B and the UE activate a compressed mode, if needed.

The compressed mode is to make a transmission gap (idle time) by compressing a transmission interval of transmission data at the time of transmitting the transmission data. Then, the UE changes a received frequency band during this transmission gap, and measures signal level of the CPICH of other frequency bands. What is well known as a method of the compressed mode is to increase transmission speed temporarily by making an SF (Spreading Factor: diffusivity) one half during compression transmission so that it may be possible to transmit the same number of bits, as those to be transmitted in an ordinary time, in a slot other than the transmission gap. In this method, transmission power is strengthened temporarily during compressed transmission since a transmission bit rate has been increased. When transmission power becomes large, signal interference between channels increases, and it means that an available channel number decreases consequently. As the result, the radio capacity drops.

In addition, as operations in the compressed mode, three kinds of compressed mode operations are defined. They are, a method of making both of the uplink and the downlink set in the compressed mode, a method of making only the uplink set in the compressed mode, and a method of making only the downlink set in the compressed mode.

When the UE has only one receiver, i.e., a single receiver, it is necessary to be made set in the compressed mode in order to measure a different frequency. The different frequency means a frequency different from a frequency currently being used by the UE. When the compressed mode in the uplink is unnecessary, the UE stops downlink signal reception with continuing uplink signal transmission, and measures a different frequency. When both links of the uplink and the downlink need to be made set into the compressed mode, the UE stops usual transmission and reception, and measures a different frequency.

When the UE has two receivers, i.e., a dual receiver, the compressed mode may be not necessary. On the other hand, also in the case of the dual receiver, depending on a frequency which is measured, the compressed mode in the uplink may be needed. When making only the uplink set in the compressed mode, the UE stops usual transmission and measures a different frequency with one receiver.

For example, the UE with dual receiver can receive two frequencies simultaneously while transmitting data. Here, it is assumed that the UE is a dual receiver terminal which supports frequency bands 1, 3, and 5. As shown in FIG. 25, the frequency band 1 is 1920 to 1980 MHz in the uplink, and is 2110 to 2170 MHz in the downlink. The frequency band 3 is 1710 to 1785 MHz in the uplink and is 1805 to 1880 MHz in the downlink. The frequency band 5 is 824 to 849 MHz in the uplink and is 869 to 894 MHz in the downlink.

In this case, the dual receiver terminal can receive simultaneously the frequency band 1 and the frequency band 5, whose operating frequencies are separated each other, without using the compressed mode. Therefore, the UE, which is locating in an area of the frequency band 1, can measure the frequency band 5 even if not using the compressed mode.

However, when the UE, which is locating in the area of the frequency band 1, measures the frequency band 3, frequencies are close in the case of the downlink (1805 to 1880 MHz)

of the frequency band 3, and the uplink (1920 to 1980 MHz) of the frequency band 1. Hence, there is a possibility that transmission radio signal of the UE itself affects the measurement of the downlink radio signal if transmission of the UE is not stopped. Therefore, it is necessary to perform the compressed mode for the uplink. Similarly, when the UE locating in the area of the frequency band 3 measures the frequency band 3, and also when the UE locating in the area of the frequency band 5 measures the frequency band 5, it is supposed that the compressed mode only in the uplink is needed.

These three kinds of compressed modes are properly used according to the construction and operation of the UE, such as availability of the dual receiver, and interlock operation of the transmitter and the receiver.

Furthermore, according to the 3GPP specifications, it is defined as a restriction of different frequency measurement that the UE is to measure up to two different frequencies. Therefore, even if the RNC instructs the UE to measure three or more frequencies in a cell, the UE measures up to two frequencies, and does not measure the remaining frequencies.

In addition, the necessity of the compressed mode activation at the time of the different frequency measurement in the UE has been determined beforehand as a UE capability indication for every combination of an operating frequency band and a measurable frequency band by the UE. When the UE establishes an RRC (Radio Resource Control) connection to the RNC before communication start, the content of the UE capability indication is reported to the RNC by the RRC CONNECTION SETUP COMPLETE message of the RRC protocol.

The RNC designates the Node-B and the UE to activate the compressed mode on the basis of the UE capability indication, which has been reported beforehand from the UE, if necessary, when the UE performs the different frequency measurement.

In addition, Japanese Patent Laid-Open No. 2003-078936 discloses the handover system technology which performs the handover to a cell using a different frequency by the single receiver UE with suppressing the execution of the compressed mode as much as possible without measuring a pilot signal other than a frequency signal for communication. According to this technology, the handover is executed as follows. First, when the UE under communication with another frequency approaches a cell using a different frequency, a radio signal at the frequency for communication which is transmitted by the UE is detected as jamming in the Node-B of the cell. Therefore, the Node-B of the cell requests the activation of the compressed mode to the RNC. When the designation of the compressed mode is issued, the Node-B executes the compressed mode in the downlink to make it possible for the UE to receive a frequency of the Node-B. As a result, the UE knows own approach to the cell at the different frequency, and performs the handover. In addition, by performing control so as to execute the compressed mode intermittently, the execution of the compressed mode is suppressed as much as possible.

As explained above, it is specified that, even if the IMT-2000 mobile communication system is developed in the environment which permits the mixed usage of a plurality of frequency bands or a plurality of frequencies, it is possible to measure the different frequency by executing the compressed mode and to perform the handover. However, it was not possible that the mobile communication system itself can flexibly control the selection of the frequency band or frequency for the UE to perform the handover.

Therefore, it was necessary to assure an inter-frequency hard handover to all the frequency bands which the UE supported. Hence, the RNC confirmed all the frequency bands included in the UE capability indication reported from the UE to activate the compressed mode when the compressed mode was required for at least one frequency band which the UE supported. As a result, even a case where the compressed mode might have been unnecessary in an certain combination of measurement frequencies, the compressed mode was activated, and in consequence, there was a problem that signal interference between channels was likely to increase and radio capacity decreased.

SUMMARY OF THE INVENTION

The present invention aims at providing a mobile communication system, a radio network controller (RNC), and a neighbor cell list filtering method which can control the selection of a frequency to be used in a cell of a handover partner when the UE performs the hard handover.

In order to achieve the object, the RNC of the present invention, installed in the mobile communication system in which the hard handover using different frequencies is implemented, is characterized by providing an office data storage, a frequency filtering controller and a call controller.

The office data storage stores use priority data on frequencies, i.e. the priority data for each frequency to be used, and a neighbor cell list including frequency information used by every neighbor cell as office data. The frequency filtering controller performs filtering processing of the neighbor cell list so as to include only suitable neighbor cells as candidates of the handover partner. The filtering processing is performed by using frequency information available for the UE, which has been reported by the UE capability indication beforehand from the UE to the RNC, and the use priority data on the frequencies stored in the office data storage. Among neighbor cells originally listed in the neighbor cell list, only neighbor cells using frequency bands available for the UE and having high priority are left in the neighbor cell list with limitation of predetermined number of frequencies by the filtering processing. And, the call controller reports this filtered neighbor cell list to the UE.

Hence, the present invention can control the selection of frequency to be used in the neighbor cell which becomes a candidate of the hard handover partner.

In addition, the information having reported beforehand from the UE to the RNC further includes compressed mode necessity condition information in accordance with the combination on a frequency currently used by the UE and other frequencies which are available for the UE to measure. Thereby, the call controller refers to the compressed mode necessity condition information and judges necessity of the compressed mode for the combination on a frequency currently used by the UE and each frequency used by each neighbor cell included in the filtered neighbor cell list, and can designate the Node-B and the UE to activate the compressed mode only when the compressed mode is required. This means that the present invention can reduce occurrences of interference due to the compressed mode operation because an unnecessary compressed mode is not activated.

BRIEF DESCRIPTION OF THE DRAWINGS

Exemplary features and advantages of the present invention will become apparent from the following detailed description when taken with the accompanying drawings in which:

FIG. 5 shows the neighbor cell list provided in the office data for the RNC according to a first embodiment of the present invention;

FIG. 7 is a table showing the content of the UE capability indication of the UE according to the first embodiment of the present invention;

FIG. 8 is a table showing frequency band priority assigned in the office data according to the first embodiment of the present invention;

FIG. 9 is a table showing frequency band priority assigned in the office data according to the first embodiment of the present invention;

FIG. 10 is a neighbor cell list showing neighbor cells as measuring objects obtained by frequency filtering processing according to the first embodiment of the present invention;

FIG. 13 is a drawing showing the network construction managed by a plurality of network operators according to a second embodiment of the present invention;

FIG. 14 is a table showing frequency band priority in the network managed by a plurality of network operators according to the second embodiment of the present invention;

FIG. 15 is a table showing frequency priority in the network managed by a plurality of network operators according to the second embodiment of the present invention;

FIG. 16 is a neighbor cell list showing neighbor cells as measuring objects obtained by frequency filtering processing for the UE-a in the network managed by a plurality of network operators according to the second embodiment of the present invention;

FIG. 18 is a table showing the example of judgment of compressed mode necessity for the UE-a in the network managed by a plurality of network operators according to the second embodiment of the present invention;

FIG. 22 is a list of a specific example for explaining judgment of frequency priority according to the third embodiment of the present invention;

FIG. 23 is a neighbor cell list showing neighbor cells as measuring objects obtained by frequency filtering processing according to the third embodiment of the present invention;

FIG. 25 is a table showing available frequency bands and frequencies defined by the 3GPP;

FIG. 26 is a table showing the relation between the UARFCN and actual carrier frequencies for general channels defined by the 3GPP;

FIG. 27 is a table showing the relation between the UARFCN and actual carrier frequencies for additional channels defined by the 3GPP; and FIG. 28 is a list showing the relation between the UARFCN and actual carrier frequencies in each frequency band defined by the 3GPP.

DESCRIPTION OF THE EXEMPLARY EMBODIMENTS

Best modes for carrying out the present invention will be described in detail with referring to drawings.

Figure 1:
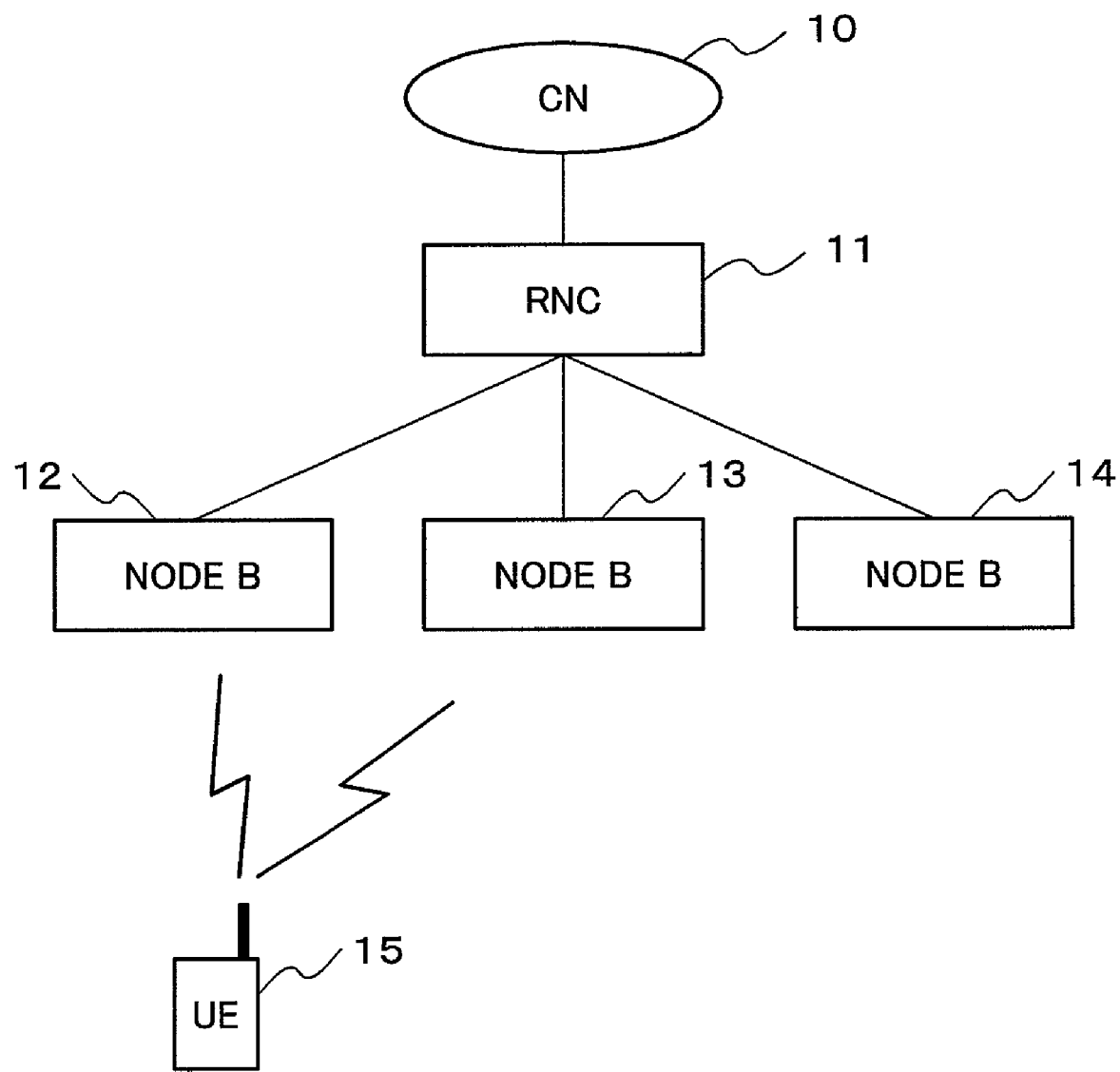
FIG. 1 is a block diagram showing the construction of a mobile communication system according to an embodiment of the present invention.

FIG. 1 is a block diagram showing the schematic construction of a mobile communication system according to a best mode for carrying on the present invention. With referring to FIG. 1, the mobile communication system has a radio network controller (RNC) 11 and base stations (Node-Bs) 12 to 14. The RNC 11 is connected to a core network (CN) 10, and the Node-Bs 12 to 14 are connected to the RNC 11. The Node-Bs 12 to 14 can be connected to a user equipment (UE) 15 with a radio channel. In addition, although this figure shows only the construction for simple illustration, the present invention is not limited to the construction.

The RNC 11 processes the call control which enables communication for the UE 15 in the mobile communication network, the report of a neighbor cell list to the UE 15 for making the handover possible, and the like.

The Node-Bs 12 to 14 are connected to the UE 15 with a radio channel in a predetermined frequency band. In this mobile communication system, mixed use of a plurality of frequency bands and a plurality of frequencies is permitted, and the UE 15 can perform the hard handover using different frequencies, i.e. the frequency used before the handover and the frequency used after the handover are different each other.

Figure 2:
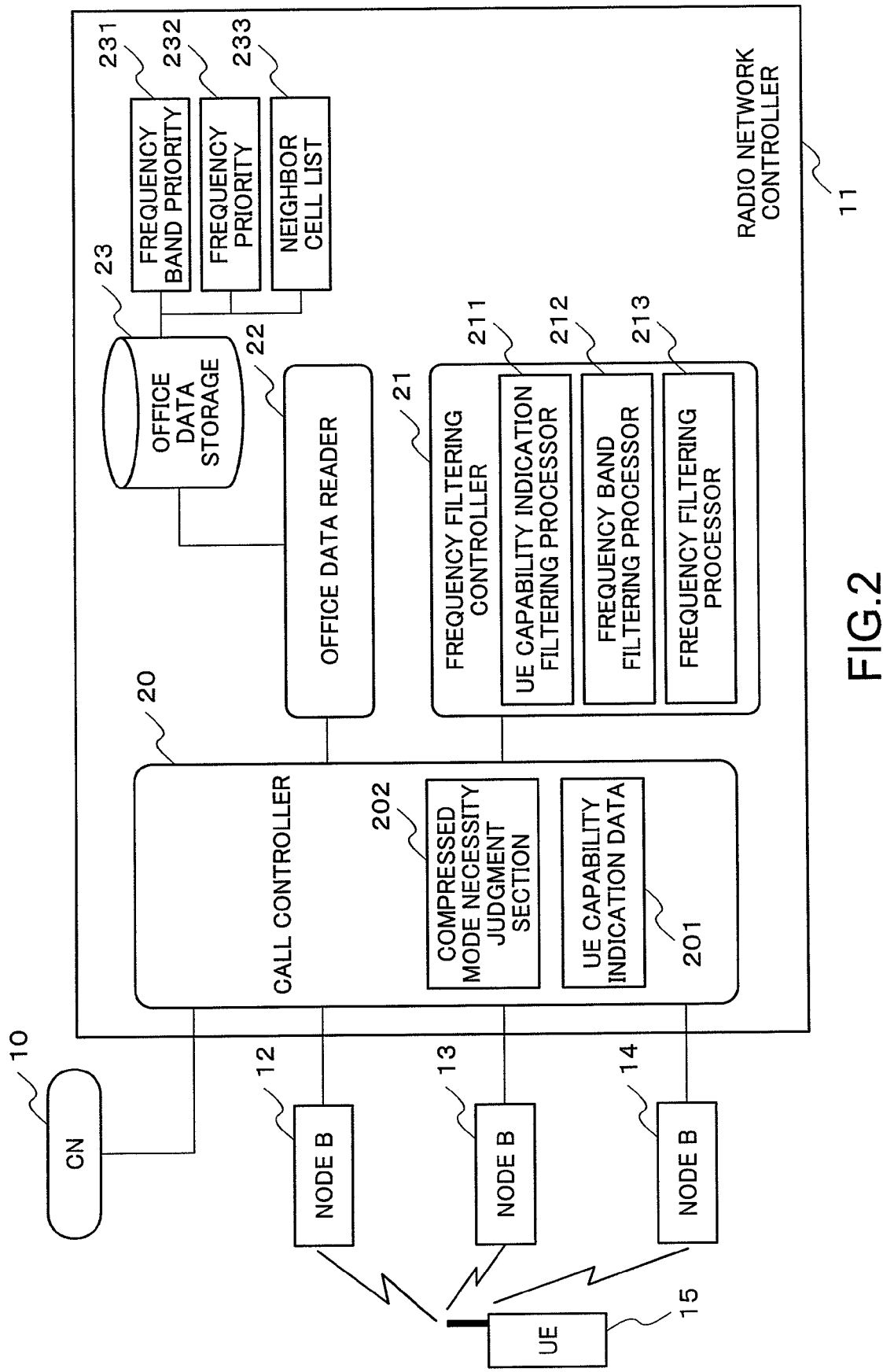
FIG. 2 is a block diagram showing the construction of the RNC according to an embodiment of the present invention.

FIG. 2 is a block diagram showing the construction of the RNC 11 according to this embodiment of the present invention. With referring to FIG. 2, the RNC 11 has a call controller 20, a frequency filtering controller 21, an office data reader 22, and an office data storage 23. In addition, FIG. 2 shows only a principal part of the RNC 11 which relates to the present invention.

The office data storage 23 stores various office data which specify system conditions. The office data includes use priority of each frequency band (frequency band priority 231), use priority of each frequency (frequency priority 232) and a neighbor cell list 233. The frequency band priority 231 and the frequency priority 232 have been assigned beforehand by the network operator which manages the mobile communication system. The neighbor cell list 233 is the information of describing operating frequency bands and operation frequencies used by each cell of all cells managed by the RNC. Then, the neighbor cell list 233 is managed as a list of describing the information of neighboring cells for each Node-B of all Node-b managed by the RNC.

The office data reader 22 reads office data from the office data storage 23 according to a request from the call controller 20.

The call controller 20 performs the call control which enables communication for the UE 15 in the mobile communication network. The call control includes the termination of control signals in various protocols, such as an NBAP (Node B Application Protocol), and an ALCAP (Access Link Control Application Protocol), between the RNC 11 and respective Node-Bs 12 to 14, and the termination of control signals, such as RRC (Radio Resource Control), between the RNC 11 and the UE 15.

When the request for different frequency measurement is activated by a certain factor or trigger, the call controller 20 instructs the frequency filtering controller 21 to execute filtering processing mentioned later, and determine the neighbor cell list including only cells which use different frequencies as actual measuring objects. Then, based on the neighbor cell list after the filtering processing and the UE capability indication reported from the UE 15, the compressed mode necessity judgment section 202 in the call controller 20 decides the necessity of the compressed mode for the different frequency measurement. In addition, it is supposed that a report from the UE 15, which is moving away from the Node-B of the cell currently the UE 15 being located, to the call controller to notify deterioration of the operating frequency quality is an example of factor to activate the request for different frequency measurement.

Here, when instructing filtering processing to the frequency filtering controller 21, the call controller 20 reports office data and the UE capability indication to the frequency filtering controller 21. The office data is requested of the office data reader 22 and is read from the office data storage 23, and the office data includes the neighbor cell list, use priority of frequency bands, and use priority of frequencies. The neighbor cell list is corresponding to the Node-B of the cell in which the UE 15 currently being located, and lists frequencies of neighboring cells around the Node-B. The UE capability indication has been reported beforehand to the RNC 11 from the UE 15 at the time of connection establishment with the UE 15, and is stored as UE capability indication data 201 in the call controller 20. The UE capability indication includes information on frequency bands available for use in the UE 15, and information of defining the necessity of compressed mode activation at the time of different frequency measurement for every combination of operating frequency band being used in the current cell and frequency bands available for use in the UE 15.

Hence, the compressed mode necessity judgment section 202 decides the necessity of the compressed mode for different frequency measurement to be performed by the UE 15 based on the necessity information on the compressed mode activation, which is included in the UE capability indication data 201, and the combination of information on frequency band, which is used in the current cell and is also included in the UE capability indication data 201, and frequency bands of different frequencies listed in the neighbor cell list obtained by the frequency filtering controller 21. In addition, the different frequencies listed in the neighbor cell list obtained by the frequency filtering controller 21 are frequencies which the UE 15 can actually measure with corresponding to the UE capability indication.

After instructing the Node-B and the UE 15 to activate the compressed mode if needed, the call controller 20 sends to the UE 15 the neighbor cell list including only the information on different frequencies as measuring objects, which has been created by the filtering processing, and then, instructs the UE 15 to perform different frequency measurement. The Node-B, which is instructed to activate the compressed mode, is the Node-B currently under communication with the UE 15.

The Node-B and the UE 15 activate the compressed mode in accordance with the instruction by the RNC 11. In addition, the UE 15 measures signal of the CPICH (Common Pilot Channel) transmitted by respective neighboring cells in accordance with respective frequencies listed in the neighbor cell list reported by the RNC 11.

Figure 3:
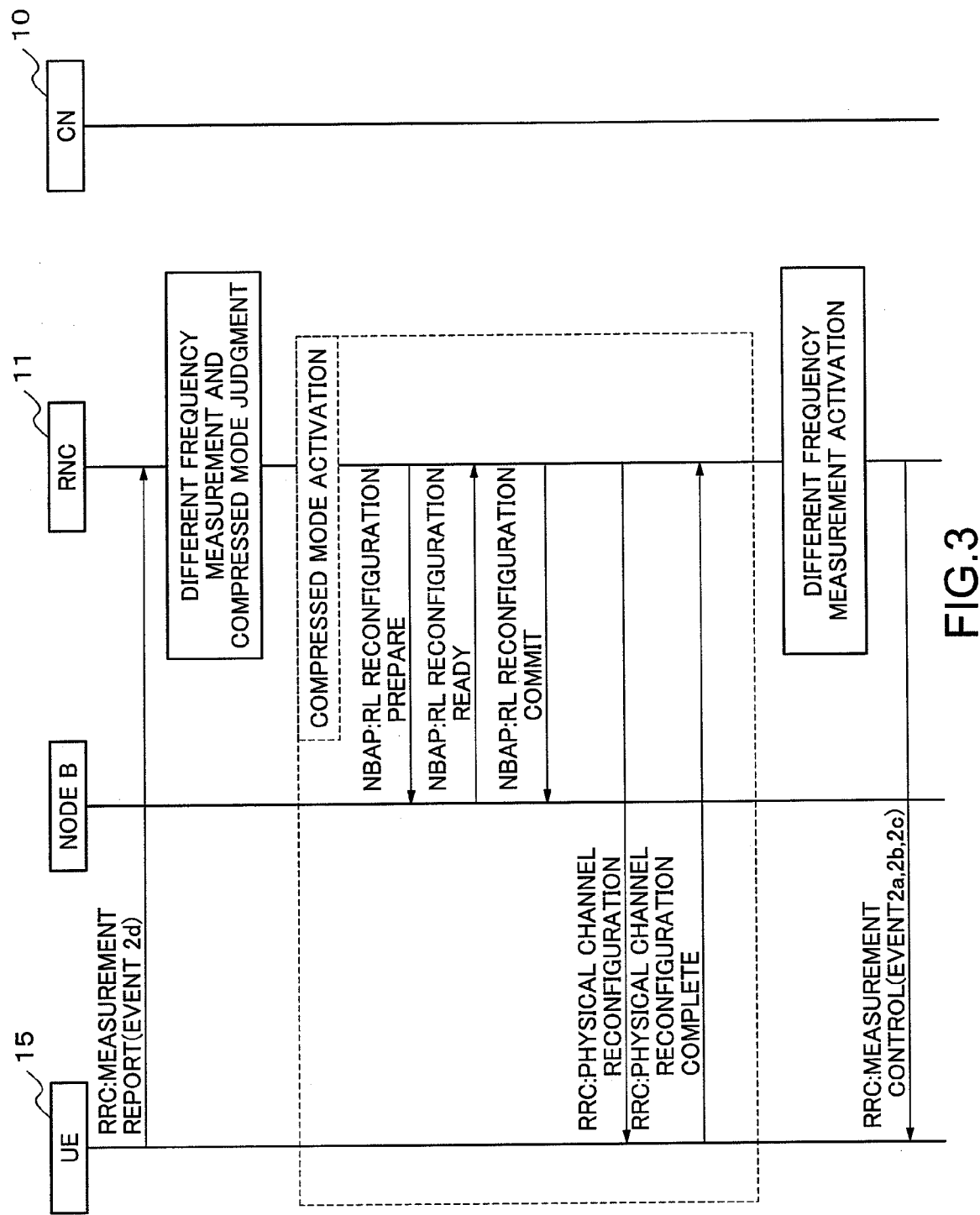
FIG. 3 is a sequence diagram showing the operation of the RNC of the mobile communication system according to an embodiment of the present invention for activating different frequency measurement.

FIG. 3 is a sequence diagram showing operation of the mobile communication system according to this embodiment to activate different frequency measurement. With referring to FIG. 3, the UE 15 sends the report that the quality of the operating frequency deteriorates, with the RRC: MEASUREMENT REPORT (Event 2d) to the RNC 11. The RNC 11 which has received the report determines the activation of different frequency measurement, and decides the necessity of the compressed mode.

When the compressed mode is required, the signaling operation surrounded by the dotted lines in FIG. 3 is performed. First, the RNC 11 reports the NBAP: RL RECONFIGURATION PREPARE message, which includes the setting information necessary for the compressed mode, to the Node-B under communication with the UE 15. The setting information necessary for the compressed mode includes information on the necessity of the compressed mode in respective the uplink and the downlink.

The Node-B prepares the compressed mode according to the reported content, and returns the NBAP: RL RECONFIGURATION READY message as a response to the RNC 11. The RNC 11 receiving the response reports the activation timing of the compressed mode to the Node-B with the NBAP: RL RECONFIGURATION COMMIT message, and reports it to the UE 15 with the RRC: PHYSICAL CHANNEL RECONFIGURATION message.

The UE 15 which has activated the compressed mode in response to the report sends the RRC: PHYSICAL CHANNEL RECONFIGURATION COMPLETE message to the RNC 11.

When the compressed mode is activated thereby, the RNC 11 sends the neighbor cell list of measuring objects and measurement event information with the RRC: MEASUREMENT CONTROL (Event 2a, 2b, 2f) to the UE 15 in order to make the UE 15 to perform different frequency measurement.

When deciding that the compressed mode is unnecessary, the RNC 11 sends the RRC: MEASUREMENT CONTROL (Event 2a, 2b, 2f) to the UE 15 without performing the signaling operation surrounded by the dotted lines in FIG. 3.

In addition, when the neighbor cell list including a cell using the frequency of the measuring object as a result of frequency filtering processing is not obtained, the RNC 11 does not activate different frequency measurement.

Here, the filtering processing will be explained in detail. The frequency filtering controller 21 performs appropriate frequency filtering processing on the basis of instruction by the call controller 20 with using the UE capability indication filtering processor 211, the frequency band filtering processor 212, and the frequency filtering processor 213 as shown in FIG. 2, and creates the neighbor cell list which includes the different frequency information only related to the measuring objects to report it to the call controller 20. The frequency filtering processing means the processing of determining a different frequency of a measuring object with using the office data read from the office data storage 23 and the UE capability indication reported from the UE 15. The neighbor cell list which includes the different frequency information only related to the measuring objects is selected on the basis of the use priority and UE capability indication from the frequencies listed in the neighbor cell list included in the office data.

Figure 4:
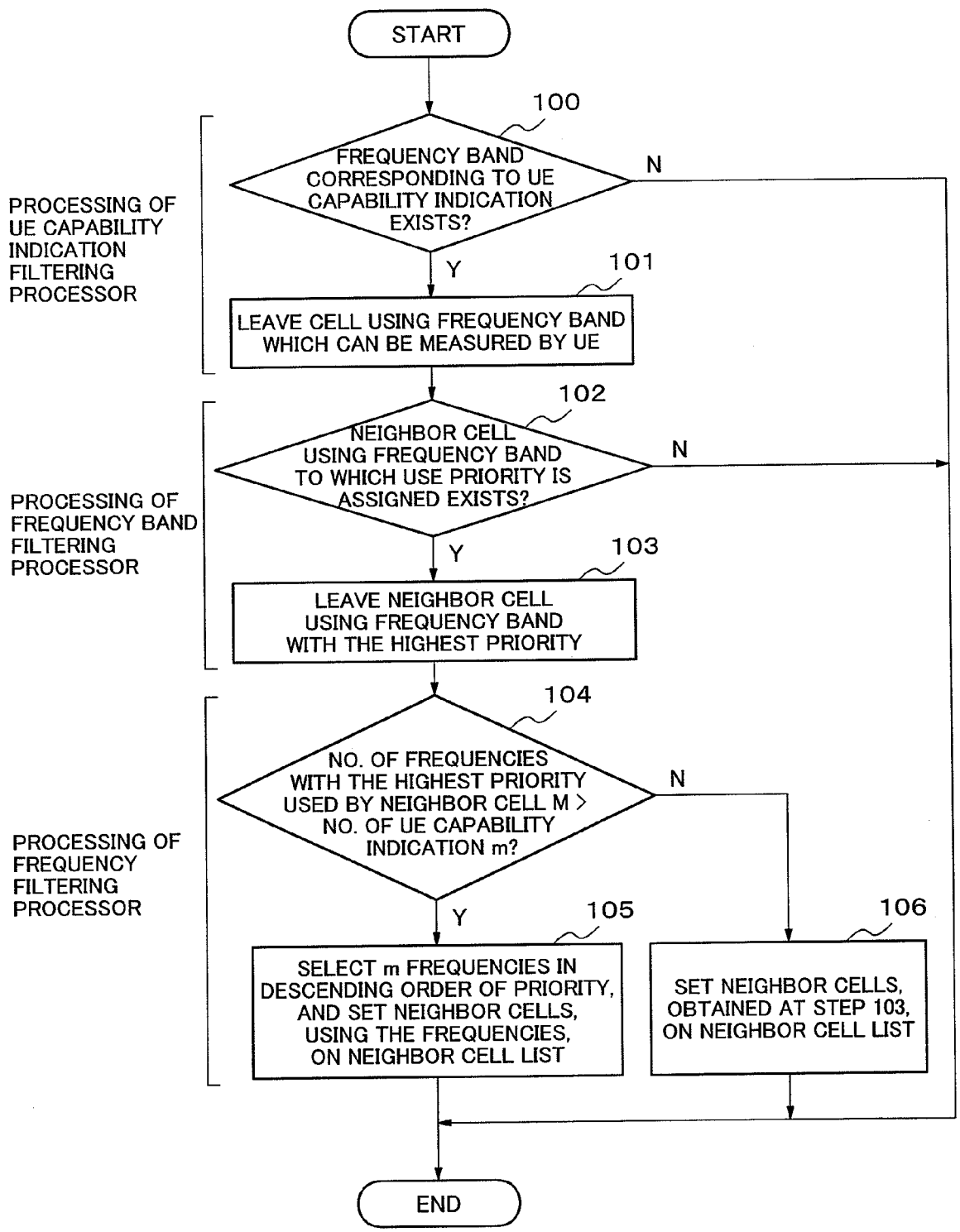
FIG. 4 is a flowchart showing the operation of the frequency filtering controller provided in the RNC according to an embodiment of the present invention.

FIG. 4 is a flowchart showing the operation using the UE capability indication filtering processor 211, the frequency band filtering processor 212, and the frequency filtering processor 213 of the frequency filtering controller 21 provided in the RNC 11 according to this embodiment. With referring to FIG. 4, the UE capability indication filtering processor 211 confirms frequency bands which can be measured by the UE 15 on the basis of the information on the UE capability indication reported from the call controller 20, and decides whether there is any neighbor cell, which uses a frequency band which can be measured by the UE 15, among the frequencies listed in the neighbor cell list included in the office data reported from the call controller 20 (step 100).

When there is no cell which uses a frequency band, which can be measured by the UE 15, in the neighbor cell list, the UE capability indication filtering processor 211 informs the call controller 20 of that there is no neighbor cell becoming a measuring object to end the processing of the frequency filtering controller 21.

On the other hand, when there are one or more cells, which use frequency bands which can be measured by the UE 15, in the neighbor cell list, the UE capability indication filtering processor 211 performs the filtering processing of leaving only those cells, which use the frequency bands which can be measured by the UE 15, in the neighbor cell list, and deleting other cells (step 101). Thereby, it is possible to report the neighbor cell list which is suitable to each of user equipment (UE) even if frequency bands which can be measured by respective user equipments (UEs) are different.

Next, the frequency filtering controller 21 executes the filtering processing according to the use priority of the frequency band by the frequency band filtering processor 212. The frequency band filtering processor 212 confirms the presence of one or more cells using frequency bands to which the use priority designated in the office data reported from the call controller 20 is assigned (step 102). If a cell using the frequency band to which use priority is assigned does not exist in the neighbor cell list, the frequency band filtering processor 212 informs the call controller 20 of that there is no neighbor cell becoming a measuring object to end the processing of the frequency filtering controller 21.

When one or more cells using the frequency bands to which the priority is assigned exist in the neighbor cell list, the frequency band filtering processor 212 leaves only those cells which use the frequency band with the highest priority in the neighbor cell list (step 103).

Next, the frequency filtering controller 21 executes filtering processing according to the use priority of frequencies by the frequency filtering processor 213. Here, the processing of narrowing down a number of frequencies for measuring objects in the UE 15 is executed. A number "m" of frequencies which can be measured by the user equipment (UE) is beforehand determined, and "m=2" is specified in the 3GPP. Then, it is decided whether a number "M" of frequencies used in the cells left in the neighbor cell list is larger than the number "m" of frequencies which can be measured by the UE 15 (step 104).

When "M" is larger than "m", the frequency filtering processor 213 selects "m" frequencies among frequencies with high priority designated in the office data, and produces the neighbor cell list which includes the cells using those frequencies to report it to the call controller 20 (step 105).

If "M" is not larger than "m", the frequency filtering processor 213 produces the neighbor cell list which includes the cells left at step 103 to report it to the call controller 20 (step 106).

As described above, the frequency filtering controller 21 deletes cells, using frequency bands other than the frequency bands corresponding to the UE capability indication, from the neighbor cell list by the UE capability indication filtering processor 211, leaves the frequency band with the highest use priority, which has been designated in the office data beforehand, by the frequency band filtering processor 212, and further selects the number of frequencies, which the user equipment (UE) can measure, according to priority with using the frequency filtering processor 213 to produce only the cells using the selected frequencies as the neighbor cell list. Then, this neighbor cell list is reported to the UE 15.

Next, several embodiments will be explained using specific examples.

An inter-frequency hard handover using frequency bands and frequencies according to priority intended by the network operator, who manages the network environment in which a plurality of frequencies and a plurality of frequency bands exist, will be explained as a first embodiment. According to this embodiment, the network operator can perform setting so as to give priority to a microcell over a macrocell.

FIG. 5 shows a table showing a specific example of a neighbor cell list corresponding to the Node-B of the cell in which the UE 15 is locating and is stored in the office data provided in the RNC 11. With referring to FIG. 5, there are cells ID 1 to 30 as neighboring cells of the Node-B, and frequency bands 1, 3, and 6 are mixedly used. Three frequencies (UARFCN=9612, 9613, and 9614) are used in a frequency band 1. One frequency (UARFCN=8562) is used in a frequency band 3. One frequency (UARFCN=4162) is used in a frequency band 6.

On the other hand, it is assumed that the UE 15 is using another frequency (UARFCN=9615) in the frequency band 1.

Figure 6:
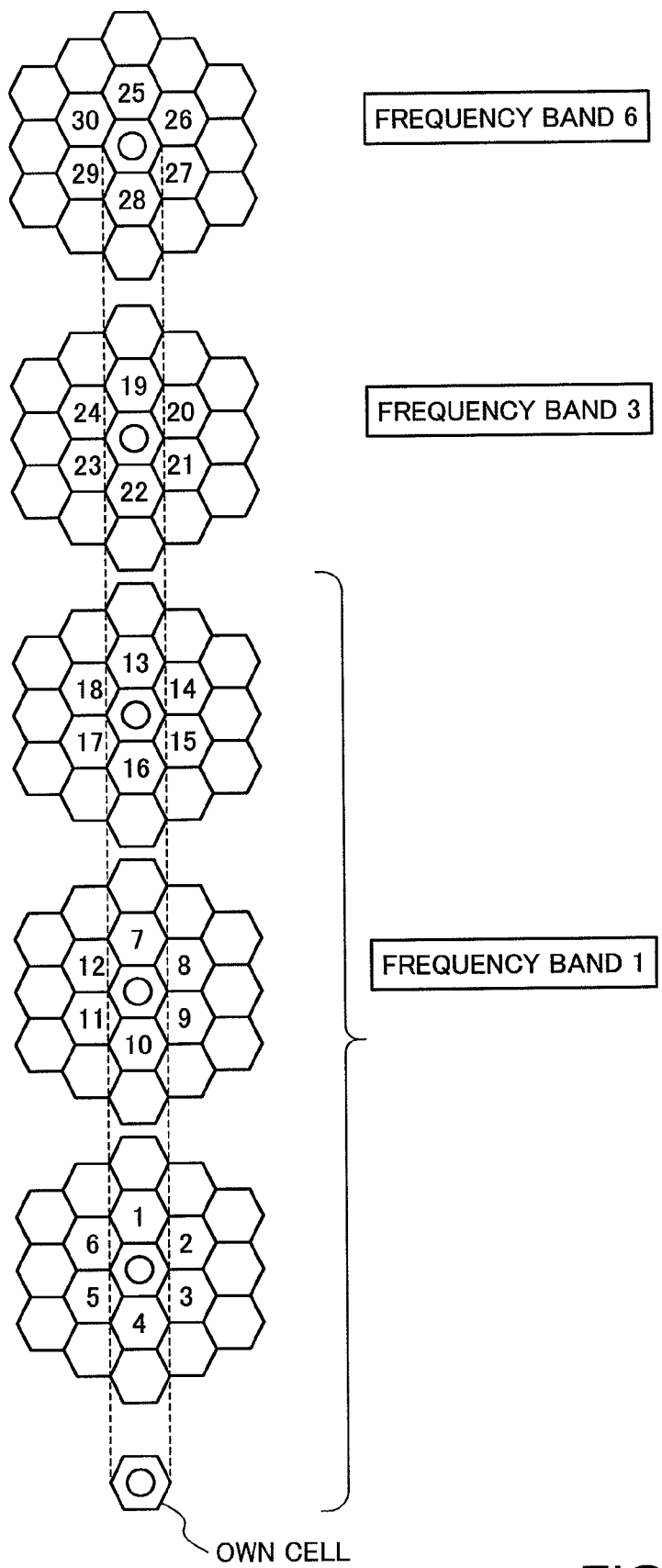
FIG. 6 is a drawing showing the allocation of neighbor cells according to the first embodiment of the present invention.

FIG. 6 is a drawing showing the allocation of neighbor cells in this embodiment. With referring to FIG. 6, neighboring cells of the own cell, in which the UE 15 is locating, has hierarchical cell construction of the frequency band 1, frequency band 3, and frequency band 6.

FIG. 7 is a table showing a specific example of the UE capability indication in this embodiment. With referring to FIG. 7, the UE 15 can locate in a network environment which uses the frequency bands 1, 3, and 5, and the UE 15 can measure frequencies in the frequency bands 1, 3, and 5 when locating in the cell using respect frequency bands. In addition, the necessity of the compressed mode for respective links of the uplink and the downlink is defined as "NEED"/"NOT NEED" in each case. For example, when measuring the frequency bands 1 and 5 in the cell using the frequency band 1, the compressed mode is unnecessary ("NOT NEED") for respective links of the uplink and the downlink. However, when measuring the frequency band 3, it is necessary ("NEED") to set up the uplink in the compressed mode, but the compressed mode is unnecessary ("NOT NEED") in the downlink. Similarly, only when measuring the frequency band 3 while the UE 15 is locating in the cell using the frequency band 3, the compressed mode is necessary ("NEED") in the uplink, but, in other cases, the compressed mode is unnecessary ("NOT NEED"). Only when measuring the frequency band 5 while the UE 15 is locating in the cell using the frequency band 5, the compressed mode is necessary ("NEED") in the uplink, but, in other cases, the compressed mode is unnecessary ("NOT NEED"). This UE capability indication has been reported beforehand to the RNC 11 from the UE 15 at the time of connection establishment with the UE 15, and is stored in the call controller 20 as the UE capability indication data 201.

FIG. 8 is a table showing the use priority of the frequency bands in this embodiment, and is stored in the office data storage 23 as the office data (frequency band priority 231). With referring to FIG. 8, the network operator has given the highest priority to the frequency band 1. Here, it is defined that the smaller a numerical value is, the higher the priority is.

FIG. 9 is a table showing the use priority of the frequencies in this embodiment, and is stored in the office data storage 23 as the office data (frequency band priority 232). The use priority of three frequencies in the frequency band 1 is defined. The highest use priority is given to a frequency of UARFCN=9614 and the use priority is hereafter defined in order of UARFCN=9613 and UARFCN=9612.

When the frequency filtering processing shown in FIG. 4 is executed in this first embodiment, the UE capability indication filtering processor 211 leaves cells, which use the frequency bands 1 and 3 corresponding to the UE capability indication of the UE 15, in the neighbor cell list at step 101. Then, the frequency band filtering processor 212 leaves cells, which uses the frequency band 1 assigned the highest priority, in the neighbor cell list at step 103. According to FIG. 5 showing the specific example of the neighbor cell list corresponding to the Node-B of the own cell for the UE 15, since three frequencies (UARFCN=9612, 9613, and 9614) are used in the frequency band 1, "M=3" holds. In addition, since "m=2" is specified in the 3GPP as mentioned above, "M>m" holds, and the frequency filtering processor 213 performs the processing of step 105.

At step 105, two frequencies with higher priority (UARFCN=9614, and 9613) are selected as the measuring objects with reference to the office data (frequency priority 232: the table in FIG. 9) in which the use priority of frequencies is shown.

Figures 11, 12:
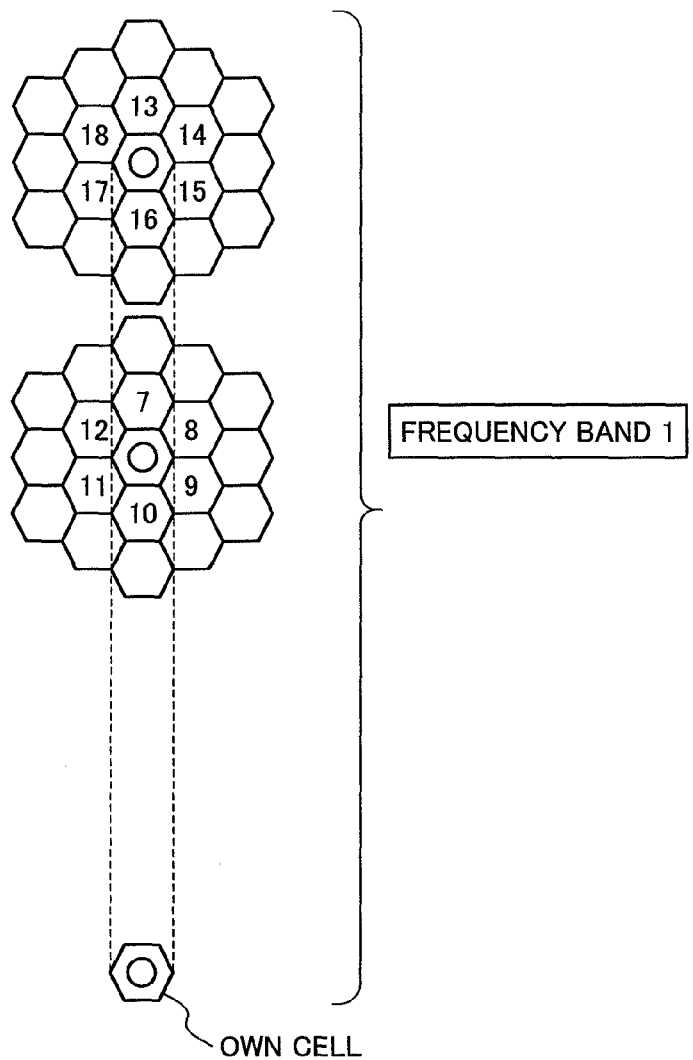
FIG. 11 is a drawing showing the allocation of neighbor cells as measuring objects obtained by the frequency filtering processing according to the first embodiment of the present invention.
FIG. 12 is a table showing a specific example of judgment of compressed mode necessity according to the first embodiment of the present invention.

FIG. 10 is a table showing the neighbor cell list including only the cells of measuring objects obtained by frequency filtering processing. FIG. 11 is a drawing showing the allocation of neighbor cells using frequencies of measuring objects obtained by frequency filtering processing. With referring to FIGS. 10 and 11, the neighbor cells (cell ID=7 to 18) which use two frequencies of UARFCN=9613, and 9614 in the frequency band 1 are selected as the measuring objects.

This result is reported to the call controller 20 as the neighbor cell list including only the cells which use the frequencies becoming the measuring objects. The call controller 20 which receives this result next judges the necessity of the compressed mode with reference to the UE capability indication in FIG. 7 in the compressed mode necessity judgment section 202.

FIG. 12 is a table showing a specific example of judgment of compressed mode necessity in this embodiment. With referring to FIG. 12, since a frequency band becoming the measuring object is the frequency band 1 and the frequency band currently used in the own cell is also the frequency band 1, it is possible to decide that both links of the uplink and the downlink do not need the compressed mode. Then, the call controller 20 instructs the UE 15 to measure a different frequency without executing the sequence of the compressed mode activation surrounded by the dotted lines in FIG. 3. As a result, an occurrence of interference between channels caused by the activation of the compressed mode is prevented.

As explained above, according to the first embodiment, in the RNC 11, the office data storage 23 stores the use priority of frequency bands (frequency band priority), and the use priority of frequencies (frequency priority), the frequency filtering controller 21 executes the frequency filtering processing using these priorities, and the call controller 20 reports the neighbor cell list, which includes only the cells using frequencies left by the frequency filtering processing has been performed, to the UE 15. Hence, it is possible to control the selection of frequency band and frequency to be used for the inter-frequency hard handover, by the intention of the network operator.

In addition, since the call controller 20 can judge the necessity of the activation of the compressed mode by the content reported with the UE capability indication about the frequencies of the measuring objects narrowed down by the frequency filtering processing, it is possible to suppress unnecessary activation of the compressed mode, and in the consequence, it is possible to reduce the increase of the interference caused by the compressed mode.

As a second embodiment, the inter-frequency hard handover under the network environment managed by a plurality of network operators will be explained. In this network, the frequency band used by each network operator is different from each other, and the RNC 11 is commonly used by all network operators.

FIG. 13 is a drawing showing allocation of cells managed by a plurality of network operators in the network. With referring to FIG. 13, the network operator A (PLMN-ID: Public Land Mobile Network Identity=A) uses the frequency band 3, the network operator B (PLMN-ID=B) uses the frequency band 1, and the network operator C (PLMN-ID=C) uses the frequency band 6. A "black circle" in drawing shows an original location of the UE 15 before moving, and a "white circle" shows a later location of the UE 15 after having moved. It is assumed that the UE-a 15 is a subscriber of the network operator A, and that the UE-b 15 is a subscriber of the network operator B. It is assumed that both of the UE-a 15 and the UE-b 15 locate in the cell using the frequency band 1 originally. It is also assumed that both of the UE-a 15 and the UE-b 15 have the UE capability indication illustrated in FIG. 7.

The RNC 11 can specify the network operator for respective UEs 15 belonging by confirming the network operator number (PLMN-ID: Public Land Mobile Network Identity) included in the subscriber's number (IMSI: International Mobile Subscriber Identity) of each UE 15. It is assumed that the IMSI has been reported to the RNC 11 from a mobile switching center (not shown) of the core network 10 beforehand, and has been stored in the call controller 20.

In this embodiment, the use priority of the frequency bands and the use priority of frequencies in the office data provided in the RNC 11 are set by respective network operators.

FIG. 14 is a table illustrating the frequency band priority of office data in this embodiment for use of the network operators A and B. With referring to FIG. 14, the network operator A uses the frequency bands 1, 3, and 6, and gives the highest priority to the frequency band 3. The network operator B uses the frequency bands 1, 3, and 6, and gives the highest priority to the frequency band 1. It is defined here that the smaller a numerical value is, the higher the priority is.

FIG. 15 is a table illustrating the frequency priority of the network operators A and B in this embodiment. In the network operator A, the use priority of three frequencies in the frequency band 3 which is given the highest priority is defined. The highest use priority is given to a frequency of UARFCN=8562 and the use priority is hereafter defined in order of UARFCN=8563 and UARFCN=8564. In the network operator B, the use priority of three frequencies in the frequency band 1 which is given the highest priority is defined. The highest use priority is given to a frequency of UARFCN=9614 and the use priority is hereafter defined in order of UARFCN=9613 and UARFCN=9612.

It is assumed that, also in this embodiment, the neighbor cell list corresponding to the Node-B of the own cell, in which the UE-a 15 and the UE-b 15 are locating, is set in the office data as shown in FIG. 5.

In such a situation, the frequency filtering processing shown in FIG. 4 is applied to the UE-a 15.

Cells which use the frequency bands 1 and 3 corresponding to the UE capability indication of the UE-a 15 shown in FIG. 7 remain in the neighbor cell list at step 101, and only the cells which use the frequency band 3 of the highest use priority remain in the neighbor cell list at step 103. According to FIG. 5, since only one frequency (UARFCN=8562) is used in the frequency band 3, "M=1" holds. In addition, since "m=2" is specified in the 3GPP as mentioned above, "M<m" holds, and the processing of step 106 is performed. At step 106, the cells which use the frequency (UARFCN=8562) left in the neighbor cell list by the processing of step 103 as measuring objects.

Figure 17:
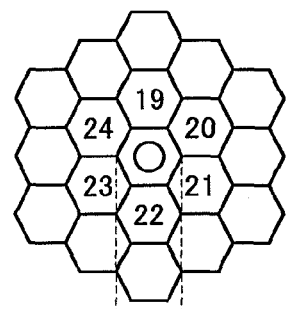
FIG. 17 is a drawing showing the allocation of neighbor cells as measuring objects obtained by frequency filtering processing for the UE-b in the network managed by a plurality of network operators according to the second embodiment of the present invention.

FIG. 16 is a table showing neighbor cells of measuring objects obtained by the frequency filtering processing for the UE-a 15 in this embodiment. FIG. 17 is a drawing showing the allocation of the neighbor cells of measuring objects obtained by the frequency filtering processing for the UE-a 15 in this embodiment. With referring to FIGS. 16 and 17, the neighbor cells (cell ID=19 to 24) which use the frequency of UARFCN=8562 in the frequency band 3 are selected as the measuring objects in the UE-a 15.

FIG. 18 is a table showing the judgment of the compressed mode necessity about the UE-a 15 in this embodiment on the basis of the UE capability indication shown in FIG. 7. Since the UE-a 15 locates in the cell using the frequency band 1 and measures a radio cannel from the cell using the frequency band 3, as shown in FIG. 18, the uplink needs the compressed mode, but the downlink does not need the compressed mode. From this, the compressed mode necessity judgment section 202 decides that it is necessary to activate the compressed mode, and in the consequence, the call controller 20 executes the sequence of the compressed mode activation enclosed by dotted lines in the sequence diagram of FIG. 3.

On the other hand, with referring to FIGS. 14 and 15, in regard to the UE-b 15 belonging to the network operator B, the frequency band having the highest use priority is the frequency band 1, a frequency of UARFCN=9614 is given the highest use priority in regard to the use priority of three frequencies in the frequency band 1, and hereafter, the priority is set in order of UARFCN=9613 and UARFCN=9612. Therefore, the result of applying the frequency filtering processing shown in FIG. 4 becomes the same as the content shown in FIGS. 10 to 12 explained in the first embodiment. Hence, since the compressed mode necessity judgment section 202 decides that there is no need of activating the compressed mode, the call controller 20 does not execute the sequence of the compressed mode activation for the UE-b 15.

As explained above, according to the second embodiment, it is possible to make the handover, as shown by "black circle"→"white circle" in FIG. 13, executed in the network managed by a plurality of network operators. That is, the UE-a 15 belonging to the network operator A, and locating in the cell managed by the network operator B can be made to hand over preferentially to the cell managed by the network operator A and the frequency band 3 is used. In addition, the UE-b 15 belonging to the network operator B, and locating in the cell managed by the network operator B can be made to hand over preferentially to the cell managed by the network operator B and the frequency band 1 is used.

According to the second embodiment, the office data storage 23 sets different priority for every network operator and the frequency filtering controller 21 performs the frequency filtering processing using the priority for every network operator. Hence, for each UE, it is possible to select the candidate of the hard handover partner belonging to the same network operator. Then, it is possible to reduce a number of activation of the compressed mode in the hard handover by selecting the handover partner reflecting the intention of each network operator.

In addition, the second embodiment may be used for selecting the handover partner on a boundary of operational areas of a plurality of network operators adjoining each other.

Furthermore, as a third embodiment, an embodiment of controlling the use priority of frequencies according to load condition of each cell using either traffic or radio loads, and executing the inter-frequency hard handover will be explained. Here, the case that priority is controlled according to a situation of radio loads will be explained. This embodiment can aim at distributing a load in each cell by making the UE handover from the heavy load cell to the light load cell. In this explanation, traffic means, for example, traffic density, a channel usage rate, or the like, and a radio load means, for example, interference quantity. In addition, it may be possible to control priority for distributing a load using these traffic and radio loads in complex.

Figure 19:
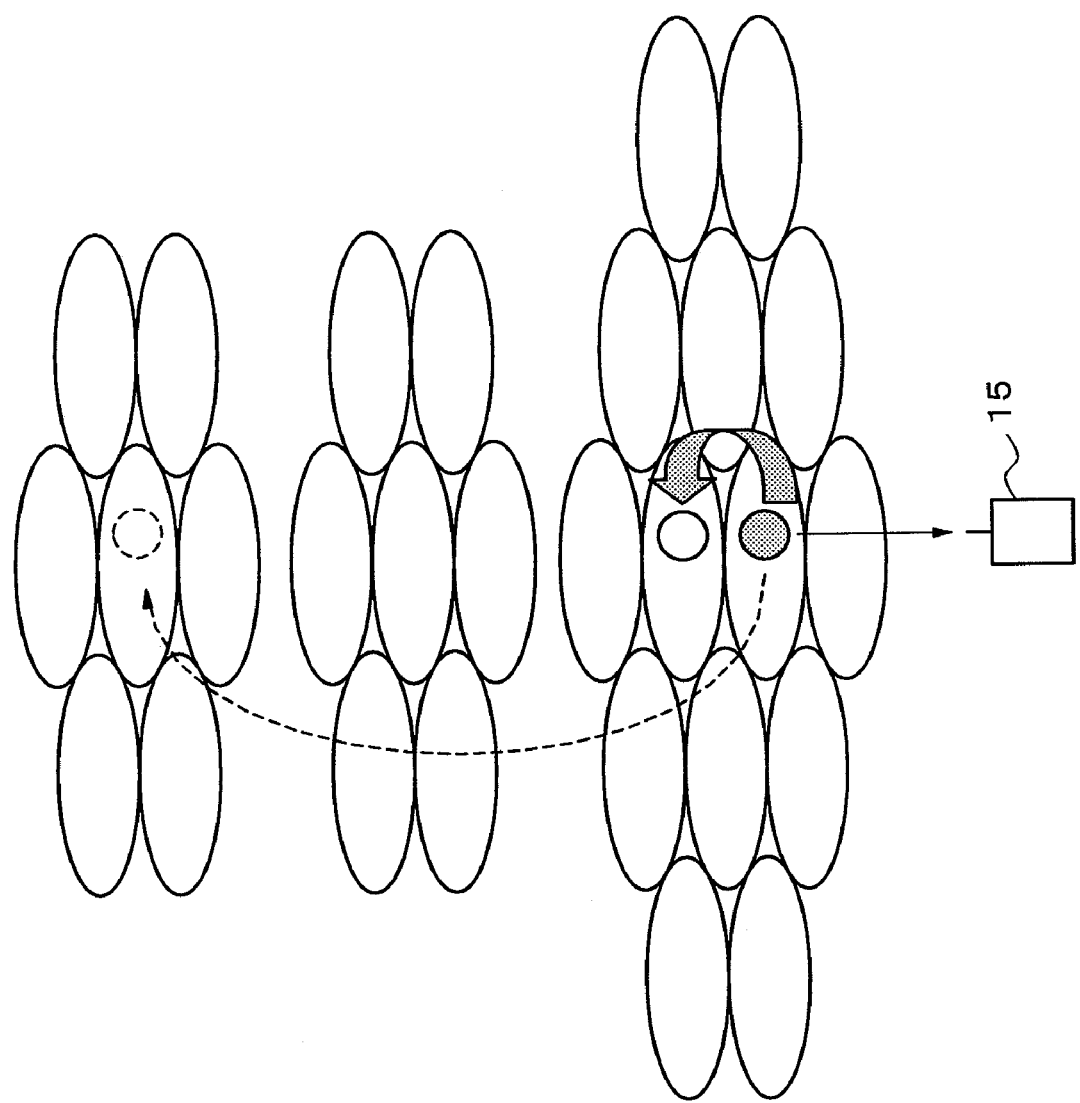
FIG. 19 is a drawing showing the network construction of a third embodiment of the present invention which controls the use priority of frequencies depending on a radio load of each cell, and executes the hard handover using different frequencies.

FIG. 19 is a drawing showing cell allocation in a third embodiment which controls the use priority of frequencies according to a situation of a radio load of each cell, and executes the inter-frequency hard handover. With referring to FIG. 19, the frequency bands 1, 3, and 6 are used in the same network and the UE 15 locates in the cell using the frequency band 1.

Figure 20:
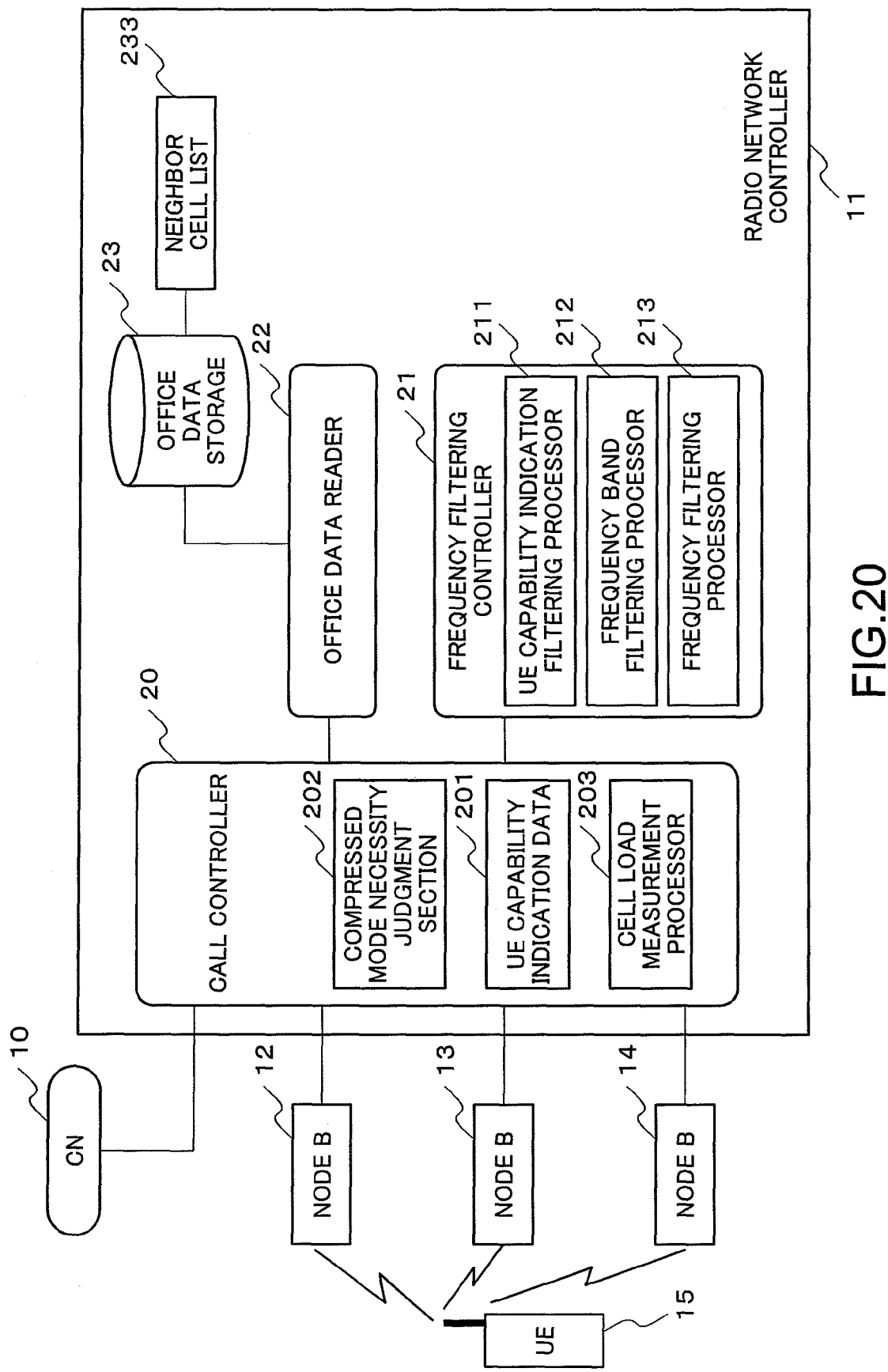
FIG. 20 is a block diagram showing the construction of the RNC according to the third embodiment of the present invention.

FIG. 20 is a block diagram showing the construction of the radio network controller (RNC) 11 according to the third embodiment of the present invention. The RNC 11 in this embodiment measures a radio load condition of each cell, and the call controller 20 includes the cell load measurement processor 203 which controls the use priority of frequencies according to the measurement result.

Figure 21:
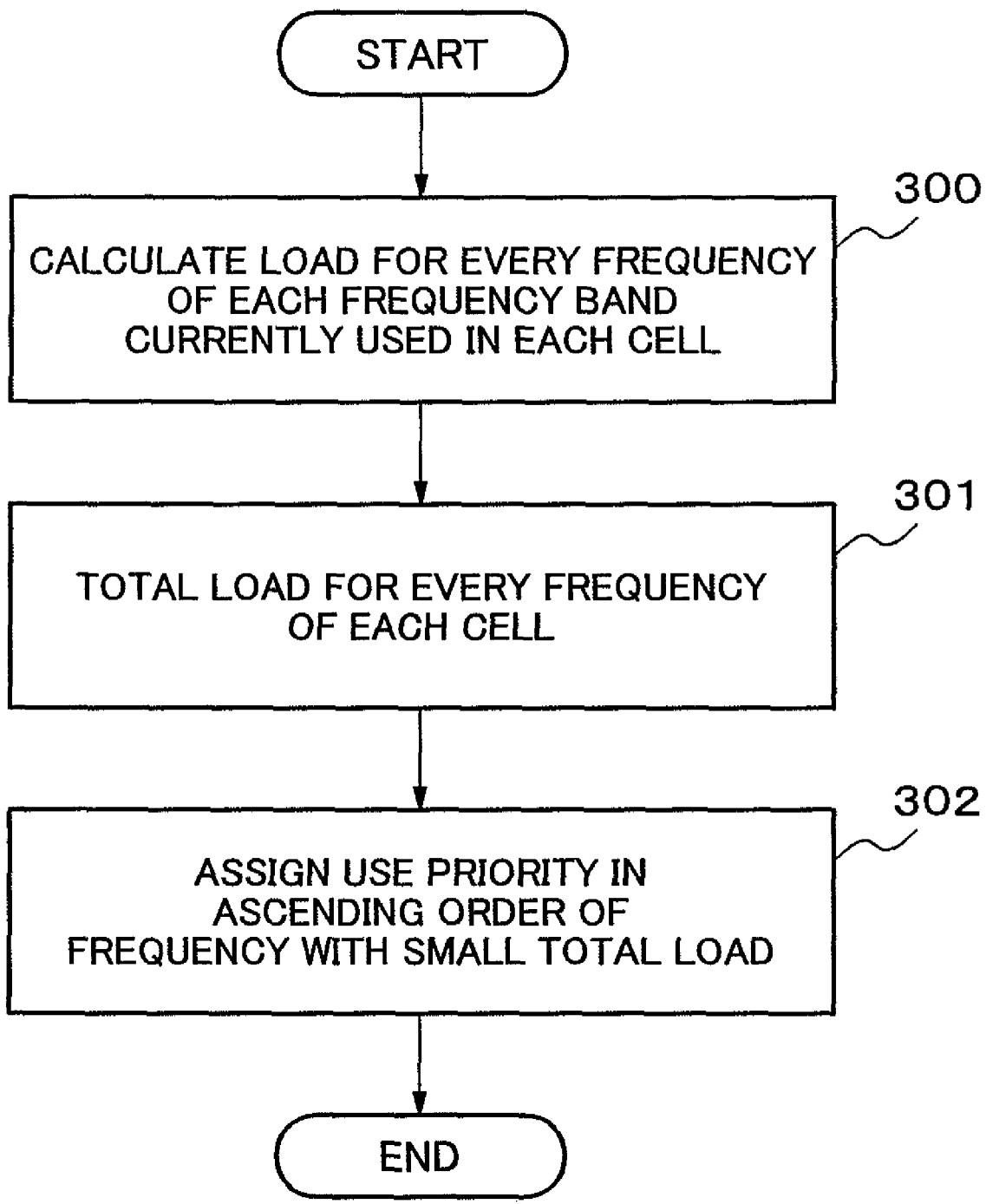
FIG. 21 is a flowchart showing the operation of the call controller according to the third embodiment of the present invention to determine the frequency priority in accordance with the radio load.

FIG. 21 is a flowchart showing operation of the cell load measurement processor 203 which determines the priority of a frequency band or a frequency for the handover partner according to the radio load of each cell. With referring to FIG. 21, the cell load measurement processor 203 calculates a load of every frequency of each frequency band currently used in each cell (step 300). That is, the cell load measurement processor 203 measures usage rates of respective frequencies of respective frequency bands in respective cells. Here, the value obtained by the following processing can be used, for example:

1. averaging total interference quantity in the uplink and transmission power in the downlink measured in each Node-B with a predetermined period; and
2. the value obtained by above is to be normalized, and converting the normalized value into a degree.

Next, the cell load measurement processor 203 calculates a value obtained by summing loads for every frequency of each cell (step 301). Then, the cell load measurement processor 203 gives high use priority to a frequency with a small total value (step 302). In addition, as for the use priority of frequency bands, it is sufficient to give high priority to a frequency band including a frequency with high priority.

Thus, the cell load measurement processor 203 determines the use priority of frequencies according to a situation of a radio load of each cell, reports the information to the frequency filtering controller 21, and makes the frequency filtering controller 21 execute the frequency filtering processing. Thereby, it is possible to change dynamically the use priority of frequencies according to occasional load conditions of each cell.

FIG. 22 shows the neighbor cell list for specifically explaining the judgment of frequency priority. With referring to FIG. 22, there are cells with cell IDs 1 to 30 as neighboring cells of the own cell of the UE 15, and a radio load for every cell, and a total load value and frequency priority for every frequency are shown.

A total value of a radio load in the frequency of UARFCN=9612 of the frequency band 1 is 2.1, a total value of a radio load in the frequency of UARFCN=9613 of the frequency band 1 is 2.0, and a total value of a radio load in the frequency of UARFCN=9614 of the frequency band 1 is 2.9. A total value of a radio load in the frequency of UARFCN=8562 of the frequency band 3 is 2.2, a total value of a radio load in a frequency of UARFCN=4162 of the frequency band 6 is 1.9. Therefore, the highest priority is given to the frequency of UARFCN=4162 of the frequency band 6, a total value of loads of which is minimum.

Figure 24:
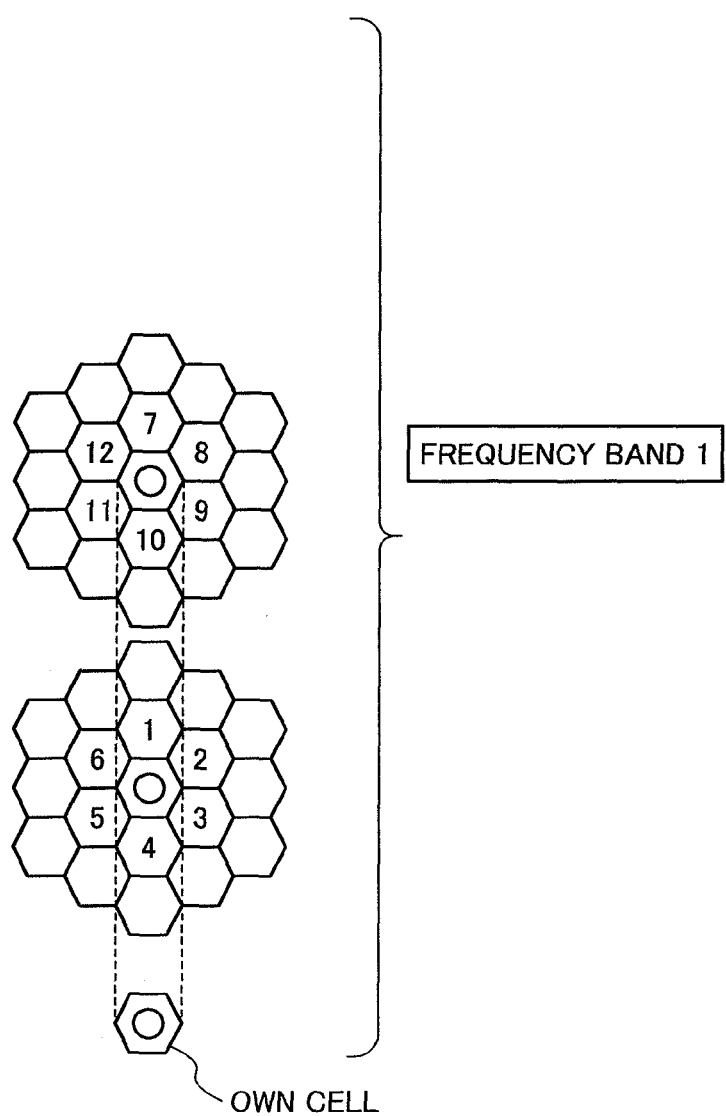
FIG. 24 is a drawing showing the allocation of neighbor cells as measuring objects obtained by the frequency filtering processing according to the third embodiment of the present invention.

Here, assuming that the UE 15 has the UE capability indication shown in FIG. 7, the frequency band 6 is not included in the measurable frequency bands by the UE 15. Hence, when the frequency filtering processing is executed, the frequency band 6 is deleted from the neighbor cell list in the UE capability indication filtering processor 211. When two measurable frequencies by the UE 15 are selected, a frequency with next high priority is UARFCN=9613 of the frequency band 1, and a frequency with next high priority but one is UARFCN=9612 of the frequency band 1. Since both frequencies belong to the frequency band 1 and are frequency bands which can be measured by the UE 15, the cells using those frequencies are selected as measuring objects. FIG. 23 is the neighbor cell list showing cells of measuring objects obtained by the frequency filtering processing in this embodiment. In addition, FIG. 24 is a drawing showing the allocation of neighbor cells of measuring objects obtained by the frequency filtering processing in this embodiment. With referring to FIGS. 23 and 24, the neighbor cells (cell ID=1 to 12) which use two frequencies of UARFCN=9612 and 9613 in the frequency band 1 are selected as the measuring objects.

In this embodiment, since the UE 15 locates in the cell using the frequency band 1 and a frequency band becoming the measuring object is also the frequency band 1, the compressed mode necessity judgment section 202 of the call controller 20 decides with reference to the UE capability indication shown in FIG. 7 that there is no need of activating the compressed mode.

According to the third embodiment, since the call controller 20 of the RNC 11 dynamically controls the use priority of the frequency on the basis of traffic or radio loads, it is possible to reduce the number of activation of the compressed mode in the frequency which is largely influenced by interference caused by the compressed mode, and to reduce bad effect of the interference.

In addition, in the third embodiment, it may also be possible to evaluate both usage rates of the frequency of the operating channel and the frequency of the channel to be used as the candidate of the handover, and to control the use priority of the frequency for the handover should be performed on the basis of the result of the evaluation.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. A radio network controller, which reports a neighbor cell list, including information on neighbor cells which become candidates of a hard handover partner with frequency information to be used by respective neighbor cells, to a user equipment (UE) when a hard handover using different frequencies is performed in a mobile communication system, comprising:

a frequency filtering controller which performs filtering processing to produce the neighbor cell list by using information on frequencies available for the user equipment, the information having been reported in advance by the user equipment as UE capability indication information, and use priority data on frequencies, so that a number of frequencies used by neighbor cells included in the neighbor cell list becomes equal to or less than a predetermined number; and a call controller which determines use priority of frequencies by loads of every frequency currently used in each cell to instruct the frequency filtering controller to perform filtering processing using the determined use priority of frequencies as the use priority data on frequencies, and reports the neighbor cell list, for which the frequency filtering controller has performed the filtering processing, to the user equipment;

the call controller comprising:

a compressed mode necessity judgment section which decides necessity of the compressed mode with reference to information on compressed mode necessity conditions included in the UE capability indication information in accordance with a combination of information on frequencies used by neighbor cells included in the neighbor cell list and information on a frequency currently used by the user equipment included in the UE capability indication information; and wherein the call controller gives instruction to the base station and the user equipment to activate a compressed mode only when the compressed mode necessity judgment section has decided the necessity of compressed mode in an operation of different frequency measurement performed by the user equipment.

2. A radio network controller, which reports a neighbor cell list, including information on neighbor cells which become candidates of a hard handover partner with frequency information to be used by respective neighbor cells, to a user equipment (UE) when a hard handover using different frequencies is performed in a mobile communication system, comprising:

a frequency filtering controller which performs filtering processing to produce the neighbor cell list by using information on frequencies available for the user equipment, the information having been reported in advance by the user equipment as UE capability indication information, and use priority data on frequencies, so that a number of frequencies used by neighbor cells included in the neighbor cell list becomes equal to or less than a predetermined number; and a call controller which determines use priority of frequencies by loads of every frequency currently used in each cell to instruct the frequency filtering controller to perform filtering processing using the determined use priority of frequencies as the use priority data on frequencies, and reports the neighbor cell list, for which the frequency filtering controller has performed the filtering processing, to the user equipment;

the frequency filtering controller comprising:

a UE capability indication filtering processor which executes processing of leaving only cells, which use frequency bands included in the UE capability indication information, in the neighbor cell list; and a frequency filtering processor which executes processing of selecting a number of frequencies, which is equal to or less than a predetermined number, according to an instructed frequency use priority, and producing the neighbor cell list including only cells using the selected frequencies; and the call controller comprising:

a cell load measuring processor which determines frequency use priority by loads of every frequency currently used in each cell, and instructs the frequency filtering processor to perform filtering processing by using the determined frequency use priority; and a compressed mode necessity judgment section which decides necessity of the compressed mode with reference to information on compressed mode necessity conditions included in the UE capability indication information in accordance with a combination of information on frequencies used by neighbor cells included in the neighbor cell list and information on a frequency currently used by the user equipment included in the UE capability indication information; and wherein, the call controller gives instruction to the base station and the user equipment to activate a compressed mode only when the compressed mode necessity judgment section has decided the necessity of compressed mode in an operation of different frequency measurement performed by the user equipment.

3. The radio network controller according to claim 2, wherein the cell load measuring processor calculates a load of every frequency of each frequency band currently used in each cell, calculates a value obtained by summing loads for every frequency of each cell and gives high use priority to a frequency with a small total value.

4. The radio network controller according to claim 3, wherein the cell load measuring processor measures usage rates of respective frequencies of respective frequency bands in respective cells for calculating the load of every frequency of each frequency band currently used in each cell.

5. The radio network controller according to claim 4, wherein the cell load measuring processor obtains a first value by averaging total interference quantity in the uplink and transmission power in the downlink measured in each cell with a predetermined period, obtains a second value by normalizing the obtained first value and obtains a third value by converting the normalized second value into a degree for measuring the usage rates of respective frequencies of respective frequency bands in respective cells.

6. A method of a radio network controller which reports a neighbor cell list, including information on neighbor cells which become candidates of a hard handover partner with frequency information to be used by respective neighbor cells, to a user equipment (UE) when a hard handover using different frequencies is performed in a mobile communication system, comprising:

determining use priority of frequencies by loads of every frequency currently used in each cell;

performing filtering processing to produce the neighbor cell list by using information on frequencies available for the user equipment, the information having been reported in advance by the user equipment as UE capability indication information, and use priority data on frequencies based on the determined use priority of frequencies, so that a number of frequencies used by neighboring cells included in the neighbor cell list becomes equal to or less than a predetermined number;

reporting the neighbor cell list, for which the filtering processing has been performed, to the user equipment;

deciding necessity of the compressed mode with reference to information on compressed mode necessity conditions included in the UE capability indication information in accordance with a combination of information on frequencies used by neighbor cells included in the neighbor cell list and information on a frequency currently used by the user equipment included in the UE capability indication information; and giving instruction to the base station and the user equipment to activate a compressed mode only when the necessity of compressed mode in an operation of different frequency measurement performed by the user equipment has been decided.

7. The method of radio network controller according to claim 6, wherein the step of performing filtering processing comprises:

executing processing of leaving only cells, which use frequency bands included in the UE capability indication information, in the neighbor cell list; and executing processing of selecting a number of frequencies, which is equal to or less than a predetermined number, according to the determined use priority of frequencies, and producing the neighbor cell list including only cells using the selected frequencies.

8. The method of radio network controller according to claim 7, wherein the step of determining use priority of frequencies comprises:

calculating a load of every frequency of each frequency band currently used in each cell;

calculating a value obtained by summing loads for every frequency of each cell; and giving high use priority to a frequency with a small total value.

9. The method of radio network controller according to claim 8, wherein the step of determining use priority of frequencies further comprises measuring usage rates of respective frequencies of respective frequency bands in respective cells for calculating the load of every frequency of each frequency band currently used in each cell.

10. The method of radio network controller according to claim 9, wherein the step of measuring usage rates further comprises:

obtaining a first value by averaging total interference quantity in the uplink and transmission power in the downlink measured in each cell with a predetermined period;

obtaining a second value by normalizing the obtained first value, and obtaining a third value by converting the normalized second value into a degree.

* * * * *